(12) United States Patent
Barbieri (10) Patent No.: US 10,947,767 B2
(45) Date of Patent: Mar. 16, 2021

(54) VEHICLE PROVIDED WITH A SLIDING DOOR

(71) Applicant: AIRBUS HELICOPTERS, Marignane (FR)

(72) Inventor: Andre Barbieri, Sausset les Pins (FR)

(73) Assignee: AIRBUS HELICOPTERRS, Marignane (FR)

( * ) Notice: Subject to any disclaimer, the term of this patent is extended or adjusted under 35 U.S.C. 154(b) by 192 days.

(21) Appl. No.: 16/162,836

(22) Filed: Oct. 17, 2018

(65) Prior Publication Data

US 2019/0119966 A1 Apr. 25, 2019

(30) Foreign Application Priority Data

Oct. 20, 2017 (FR) ...................... 1771103

(51) Int. Cl.
*E05D 15/06* (2006.01)
*E05F 5/00* (2017.01)
(Continued)

(52) U.S. Cl.
CPC ............ *E05F 5/003* (2013.01); *B64C 1/1438* (2013.01); *B64C 1/1461* (2013.01);
(Continued)

(58) Field of Classification Search
CPC ..... E05F 5/003; E05F 5/02; E05F 1/16; E05F 15/646; E05F 5/006; E05F 5/00; B65H 75/486; B65H 75/425; B65H 75/4447; B65H 75/4471; B65H 75/48; B64C 1/1438; B64C 1/1461; B64C 27/06; B64C 3/00; B64C 27/04; E05Y 2201/242; E05Y 2201/672; E05Y 2201/484; E05Y 2201/26; E05Y 2800/40; E05Y 2900/502; E05Y 2201/652; E05Y 2201/21; E05Y 2900/531; E05Y 2900/53; E05Y 2201/664;
(Continued)

(56) References Cited

U.S. PATENT DOCUMENTS 3,020,580 A 2/1962 Glenn
3,131,892 A 5/1964 Salmun
(Continued)

FOREIGN PATENT DOCUMENTS

DE 102007028967 A1 12/2008
EP 0681715 B1 6/1998
(Continued)

OTHER PUBLICATIONS

French Search Report for Application No. 1771103, Completed by the French Patent Office, dated Jul. 27, 2018, 7 pages.
(Continued)

*Primary Examiner* — Chi Q Nguyen
(74) *Attorney, Agent, or Firm* — Brooks Kushman P.C.

(57) ABSTRACT

A vehicle having a door slidably mounted on a shell. The vehicle includes at least one assistance device, comprising both a winder carrying a strap and a receptacle, the winder including a brake for braking unwinding of the strap from the winder, one of the winder and receptacle being fastened to the shell and one of the winder and receptacle being fastened to the door, the strap carrying a latchplate suitable for being reversibly attached to the receptacle.

20 Claims, 3 Drawing Sheets

(51) Int. Cl.
    *B64C 1/14*    (2006.01)
    *E05F 1/16*    (2006.01)
    *B65H 75/42*   (2006.01)
    *B65H 75/44*   (2006.01)
    *B65H 75/48*   (2006.01)
    *B64C 27/06*   (2006.01)

(52) U.S. Cl.
    CPC ....... *B65H 75/425* (2013.01); *B65H 75/4447* (2013.01); *B65H 75/4471* (2013.01); *B65H 75/486* (2013.01); *E05F 1/16* (2013.01); *B64C 27/06* (2013.01); *E05Y 2201/21* (2013.01); *E05Y 2201/242* (2013.01); *E05Y 2201/26* (2013.01); *E05Y 2201/484* (2013.01); *E05Y 2201/652* (2013.01); *E05Y 2201/664* (2013.01); *E05Y 2201/672* (2013.01); *E05Y 2800/40* (2013.01); *E05Y 2900/502* (2013.01); *E05Y 2900/531* (2013.01)

(58) Field of Classification Search
    CPC . E05Y 2201/654; E05Y 2600/46; E06B 3/46; E05D 13/006
    USPC ......... 49/417, 332, 352, 404, 360, 411, 413, 49/414; 296/155; 16/49, 61, 63, 71, 78, 16/82
    See application file for complete search history.

(56) References Cited

U.S. PATENT DOCUMENTS

| | | | |
|---|---|---|---|
| 4,047,441 A | 9/1977 | Kellogg | |
| 4,887,390 A | 12/1989 | Boyko et al. | |
| 5,625,266 A | 4/1997 | Stark | |
| 6,076,883 A * | 6/2000 | Labonde | B60J 5/12 296/155 |
| 6,108,976 A | 8/2000 | Kato et al. | |
| 6,321,489 B1 * | 11/2001 | Murofushi | B60J 5/062 49/360 |
| 6,328,374 B1 | 12/2001 | Patel | |
| 7,337,581 B2 | 3/2008 | Kriese | |
| 7,877,932 B2 * | 2/2011 | Kriese | B60J 1/17 49/348 |
| 8,212,383 B2 * | 7/2012 | Ushiyama | B60R 16/0207 307/10.1 |
| 8,508,068 B2 * | 8/2013 | Ushiyama | B60R 16/0207 307/10.1 |
| 10,066,430 B2 * | 9/2018 | Joussellin | E06B 3/46 |
| 2005/0044794 A1 | 3/2005 | Kriese | |
| 2007/0296245 A1 * | 12/2007 | Kriese | B60J 5/0416 296/155 |
| 2008/0216407 A1 * | 9/2008 | Fassbender | E05F 11/385 49/227 |
| 2013/0019432 A1 | 1/2013 | Smith | |

FOREIGN PATENT DOCUMENTS

| | | |
|---|---|---|
| FR | 2873150 A1 | 1/2006 |
| GB | 2 116 252 A | 9/1983 |
| JP | 2004009897 A | 1/2004 |
| WO | 8101587 A1 | 6/1981 |
| WO | 8703033 A1 | 5/1987 |
| WO | 2015/051398 A1 | 4/2015 |
| WO | 2015124373 A1 | 8/2015 |

OTHER PUBLICATIONS

Italian Search Report and Opinion dated Aug. 9, 2019, Application No. 201800020620, Applicant Airbus Helicopters, 8 Pages.

* cited by examiner

VEHICLE PROVIDED WITH A SLIDING DOOR

CROSS-REFERENCE TO RELATED APPLICATIONS

This application claims priority to French patent application No. FR 1771103 filed on Oct. 20, 2017, the disclosure of which is incorporated in its entirety by reference herein.

BACKGROUND OF THE INVENTION (1) Field of the Invention

The present invention relates to a vehicle provided with a sliding door.

(2) Description of Related Art

An aircraft may present a cabin having a sliding door. The door may be opened in order to enable an operator to perform a task. For example, a rescuer might need to open the door in flight in order to throw a life-buoy to a casualty.

A cabin door may in particular be a door that slides along the fuselage while it is being opened. In addition, at least one end-of-stroke stop may be used to block the door when the door is fully open. In addition, a cabin door may be suitable for being jettisoned.

While the aircraft is advancing at high speed, it can nevertheless be found difficult to open a sliding door. Specifically, the movement of the aircraft can cause the door to move quickly. Such a movement is of a kind that can potentially damage the end-of-stroke stops of the door.

Conversely, the door might be difficult to close manually.

In a first strategy, the sliding door may be provided with a manual movement system. Moving the sliding door during forward flight may then be prohibited as from a predetermined threshold speed of the aircraft because of the above-mentioned difficulties.

For example, AS350, EC175, AS365, and EC130 helicopters can provide limitations on use as a function of the forward speed of the aircraft. By way of illustration, opening a sliding door may be authorized up to a speed of 110 knots on an AS350 helicopter. Closing the door is authorized up to a speed of 80 knots.

Under such circumstances, an aircraft may need to slow down during certain stages of flight. An operator may also opt to fly with the door open, but such a permanently open door gives rise to degraded aerodynamic performance of the aircraft.

In a second strategy, a motor drive system is used to open or close a sliding door on an aircraft. Nevertheless, the opening and/or closing of the sliding door can be relatively slow. This potential slowness can be troublesome during a rescue mission.

In addition, the motor drive system presents non-negligible weight and it might break down.

Finally, using a motor-driven system can make it difficult to jettison the door. Specifically, such a motor-driven system may include members, e.g. cables, that would tend to prevent jettisoning.

Document U.S. Pat. No. 6,108,976 describes an electrical system for opening/closing a door. That electrical system has a belt and an electric actuator.

Document U.S. Pat. No. 4,887,390 describes a movement system having a cable driven by an electric motor.

Document U.S. Pat. No. 5,625,266 describes a door driven by an electromechanical motor.

Document U.S. Pat. No. 7,337,581 describes means for operating a door having at least one flexible strap and a motor.

Document FR 2 873 150 describes a motor-driven system that is provided with a transmission belt, a driver, and a motor.

In a third strategy, the aircraft has an end-of-stroke shock absorber system. The arrangement of the shock absorber system may be associated with reinforcing rails or supports that carry the shock absorber system. Under such circumstances, providing a shock absorber system can have a non-negligible weight impact.

Document U.S. Pat. No. 6,328,374 B1 describes an end-of-stroke shock absorber system for a sliding door.

Document WO 2015/124373 describes a device for retracting a sliding member with shock absorption in its final position.

BRIEF SUMMARY OF THE INVENTION

An object of the present invention is thus to propose a vehicle having a sliding door and an assistance device seeking to allow the sliding door to open while the vehicle is advancing, in particular at a relatively high speed, e.g. of the order of 100 knots to 150 knots.

According to the invention, a vehicle has a shell, the shell being provided with an opening in register with a cabin of the vehicle, the vehicle including a door slidably mounted on the shell to slide between a closed position and an open position, the door shutting the opening when in the closed position.

The vehicle includes at least one assistance device, the assistance device comprising two elements, the two elements comprising respectively a winder carrying a strap and a receptacle, the winder including a brake for braking unwinding of the strap from the winder, one of said elements being fastened to the shell and one of said elements being fastened to the door. The strap extends from an end arranged in the winder to an end carrying a latchplate, the receptacle including an attachment member for reversibly attaching the latchplate to the receptacle. When the latchplate is attached to the receptacle, the winder brakes movement of the door during opening of the door, and stores energy, said winder assisting an operator to close said door by restoring said energy while closing said door when the latchplate is attached to the receptacle.

The term "shell" is used to designate a structure forming an outside surface of the vehicle. For example, the term "shell" may designate a fuselage of an aircraft or bodywork of a car.

Under such circumstances, the door may be slidably mounted by a conventional fastener system, e.g. a system including at least one rail.

Furthermore, the vehicle is provided with an assistance device for assisting an operator to open and close the door, should the operator feel the need. For example, an operator can use the assistance device to open the door quickly during a rescue mission while traveling at a high forward speed.

In contrast, the operator may choose not to make use of the assistance device, e.g. at a low forward speed of the vehicle or while on the ground and when not performing emergency operations.

In order to use the assistance device, the operator secures the latchplate in the receptacle. Under such circumstances, the operator opens the door by causing it to slide, e.g.

towards the rear of the vehicle, i.e. in a direction opposite to the direction of advance. During this step, the winder can brake, i.e. slow down the movement of the door by using its brake so as to limit the sliding speed of the door. This characteristic is particularly important on an aircraft travelling at a high forward speed. By slowing down the door, the winder tends to limit any risk of damage to end-of-stroke stops, if any, or indeed any risk of the door being torn off. At the end of the stroke, the door can be held open by a conventional blocking device.

In order to close the door, the operator operates the blocking device, if any, in order to release the door. Thereafter, the operator pulls the door in order to move it towards the closed position. The winder then exerts a force on the strap tending to move the door towards its closed position. The brake can also limit the movement of the door during this stage.

Under such circumstances, the braking provided during opening and the assistance provided during closing tend to enable the sliding door to be moved while the vehicle is advancing, even at a high forward speed, e.g. 150 knots.

The invention thus proposes a strap on a winder that can serve as a brake, at least while opening a door, and that can provide assistance in closing the door. Unlike a motor-driven system, moving the door does not depend on the speed or the operation of such a motor-driven system.

Also, it is not essential to make use of the assistance device in order to open the door. The operator may choose to move the door without assistance, by choosing not to connect the latchplate to the receptacle.

Also, the assistance device is relatively simple to position, whereas with a motor-driven system it can sometimes be difficult to install, e.g. because of difficulties in providing electrical power and difficulties of associating it with a system for jettisoning the door.

The simplicity of the assistance device can also tend to improve its cost, both financially and in terms of weight.

The vehicle may also include one or more of the following characteristics.

In one aspect, the door is slidably mounted on the shell by a mechanical operating system that is not motor-driven.

A conventional operating system, e.g. with rails and a handle, can then be used.

In one aspect, the winder is not motor-driven.

By way of example, the winder may be a passive system with a spring.

In one aspect, the winder brake comprises dynamic brake means allowing the opening of the door to be regulated at a travel speed that is too fast even if the winder is storing energy. By way of example, the dynamic braking means may be active only while the door is opening, with braking being inoperative or limited while the door is closing. Alternatively, the braking means may be active regardless of the travel direction of the door.

For example, the brake may then comprise a centrifugal brake.

The centrifugal brake may be of the type that is present on a fishing reel or in a car seatbelt system, for example.

In one aspect, the vehicle may include a jettisoning system for jettisoning the door, said jettisoning system being independent of said at least one assistance device.

It is possible to use a conventional jettisoning system.

In addition, or as an alternative, the vehicle includes a closure system for holding the door on request in said closed position, said closure system being independent of said at least one assistance device.

It is possible to use a conventional closure system.

Under such circumstances, the assistance device may be totally independent, i.e. functionally and/or mechanically distinct from a mechanism for jettisoning the door and/or a mechanism for locking the door.

While the door is being used "normally", the assistance device need not be used.

In one aspect, the receptacle may be positioned close to the center of gravity of the door in the height direction of the door.

For example, the receptacle may be positioned substantially half way up the door.

In one aspect, the opening may be defined longitudinally by walls of the shell, said walls being a rear wall and a front wall relative to the direction of advance of the vehicle, said door extending longitudinally from a rear segment to a front segment relative to said direction of advance, the door sliding from its closed position towards its open position in a direction going from the front wall towards the rear wall, and one of said elements may be fastened to the rear wall and one of said elements may be fastened to the rear segment.

This arrangement appears not to be natural. A natural arrangement would be to place the assistance device on the front wall and on the front segment of the sliding door.

By going against that prejudice, this characteristic serves to avoid the strap extending across the opening when the door is in the open position.

Optionally, the winder is fastened to the rear wall and the receptacle is fastened to the rear segment.

In one aspect, the winder includes deflector means.

The deflector means enable the strap to be guided while opening the door.

For example, the deflector means comprise a deflector for deflecting the strap through at least 90 degrees, or indeed 180 degrees. Thus, by way of example, the detector means may be C-shaped in order to constitute means for deflecting through 180 degrees.

In one aspect, the brake may comprise a rough face of the deflector means, said rough face being in contact with the strap, at least while the door is in the open position.

The roughness of a face of the deflector means in contact with the strap tends to generate friction forces on the strap opposing opening of the door, e.g. under the effect of the air stream while the vehicle is moving forwards.

In one aspect, the brake may include at least two rollers of the deflector means, each roller being provided with a braking system.

Such a braking system may be a centrifugal braking system, for example. Each roller then tends to brake movement of the strap and thus of the door.

For example, the braking system is active in only one direction of rotation of the rollers, so as to avoid braking the movement of the strap while the door is closing.

In one aspect, the brake may comprise at least two rollers of the deflector means, each roller being free to rotate in a single direction corresponding to a closing direction for the door.

In one aspect, the vehicle may be an aircraft.

In one aspect, the winder may comprise a drum having part of said strap wound thereabout, said drum being in connection with passive rewinder means that store energy when the drum rotates in an unwinding direction in which said strap is unwound, and that restore said energy when the drum rotates in a winding direction in which said strap is wound onto the drum.

This structure can turn out to be relatively simple, inexpensive, and/or light in weight.

In one aspect, the rewinder means include at least one spring.

BRIEF DESCRIPTION OF THE DRAWINGS

The invention and its advantages appear in greater detail from the context of the following description of examples given by way of illustration and with reference to the accompanying figures, in which.

Elements present in more than one of the figures are given the same references in each of them.

DETAILED DESCRIPTION OF THE INVENTION

Three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

Figure 1:
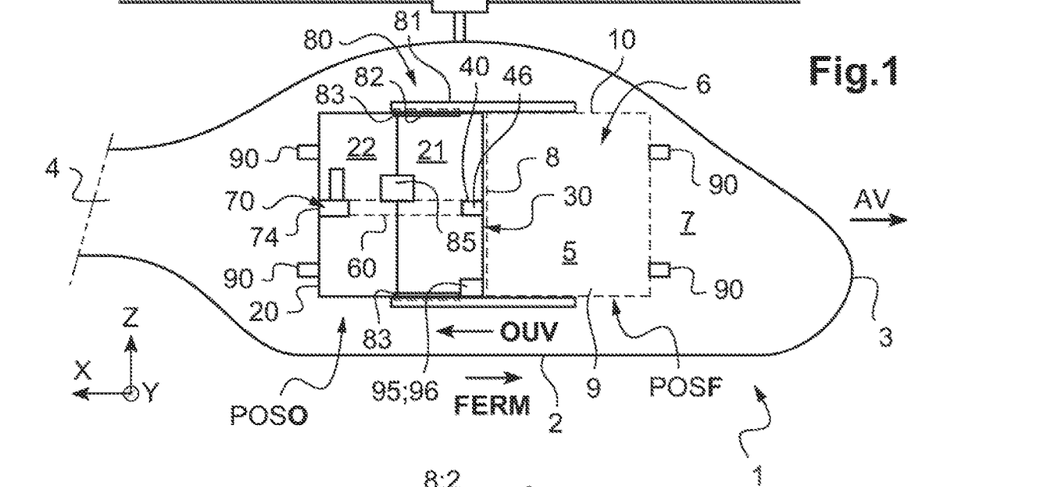
FIG. 1 is a diagram showing a vehicle of the invention.

FIG. 1 shows a vehicle 1 of the invention. The vehicle has a shell 2 that extends longitudinally from a nose 3 to a rear end 4. Under such circumstances, the vehicle travels forwards in a direction of advance AV going from the rear end 4 towards the nose 3.

The vehicle 1 may be an aircraft. In the example of FIG. 1, the vehicle 1 may be a rotorcraft having at least one rotor.

Nevertheless, the vehicle 1 may be of any other type, such as an airplane, a ship, a car, . . . .

Independently of the nature of the vehicle, the shell 2 is provided with at least one opening 6 that lies between a cabin 5 of the vehicle 1 and a medium outside the vehicle. The term "cabin" designates a space inside the vehicle, and in particular a space that can be occupied by people.

The opening 6 thus represents an opening in the shell 2 in register with the cabin 5 and the outside medium.

The opening 6 is defined longitudinally from rear to front in the direction of advance AV of the vehicle by a rear wall 8 and a front wall 7. The term "wall" designates a wall as such and/or beams and/or frames, . . . . The terms "front" and "rear" refer to the direction of advance AV of the vehicle towards the front, the front wall 7 extending longitudinally between the rear wall 8 and the nose 3.

The opening 6 is defined in elevation by a bottom 9 and a ceiling 10. The terms "bottom" and "ceiling" designate walls as such and/or beams and/or frames, . . . .

In order to close the cabin on request, the vehicle 1 has a door 20. The door 20 is mounted to slide on the shell 2 so as to be able to slide between a closed position POSF and an open position POSO. The door 20 shuts the opening 6 when it is in the closed position POSF, however when it is in the open position POSO, it no longer closes the opening, or it closes it in part only. The closed position POSF is drawn with dashed lines in FIG. 1, while the open position POSO is drawn with continuous lines.

The door 20 extends longitudinally and from the rear towards the front in the direction of advance of the vehicle from a rear segment 22 to a front segment 21. For example, each segment represents one-half of the door. The terms "front" and "rear" when associated with the term "segment" refer to the direction of advance AV of the aircraft.

The door 20 may be mounted to slide on the shell 2 by a mechanical operating system 80 that is not motor-driven. The literature describes operating systems 80 of this type.

By way of illustration, the operating system 80 may have one or more rails 81. The door 20 can then be secured to at least one slider 82 that is slidable along the rails 81.

Furthermore, the vehicle 1 may have a jettisoning system 85 for jettisoning the door 20. The literature describes jettisoning systems 85 of this type.

In the above example, the jettisoning system may comprise retractable fingers 83 that connect the door 20 on request with the sliders 82.

In an aspect, the vehicle 1 may have a closure system 95 for holding the door 20 on request in said closed position POSF and/or a blocking device 96 for holding the door 20 on request in said open position POSO. The literature describes closure systems 95 and blocking devices 96.

End-of-stroke stops 90 and/or end-of-stroke shock absorber devices may be envisaged.

Independently of the presence or absence of the above-mentioned members, the vehicle 1 includes at least one assistance device 30. FIG. 1 shows a single assistance device 30, however the vehicle could have a plurality of assistance devices 30 on a single door.

Each assistance device 30 comprises two elements 40 and 70 that are suitable for fixing respectively to the door 20 and to the shell 2. Thus, one of the two elements comprises a winder 40 having a strap 60, and the other element without the winder comprises a receptacle 70. The winder 40 includes a brake 46 for braking unwinding of the strap 60 from the winder 40.

For example, the winder 40 is fastened to the shell 2 and the receptacle is fastened to the door 20.

Optionally, with the door 20 sliding from its closed position POSF towards its open position by being moved towards the rear in an opening direction OUV going from the front wall 7 towards the rear wall 8, the other element of said elements is fastened to the rear wall 8 and one of said elements is fastened to the rear segment 22.

In the example of FIG. 1, the winder 40 is fastened to the rear wall 8, and the receptacle 70 is fastened to the rear segment 22. Under such circumstances, the strap does not obstruct the opening 6 when the door is in the open position POSO.

Figures 2, 3:
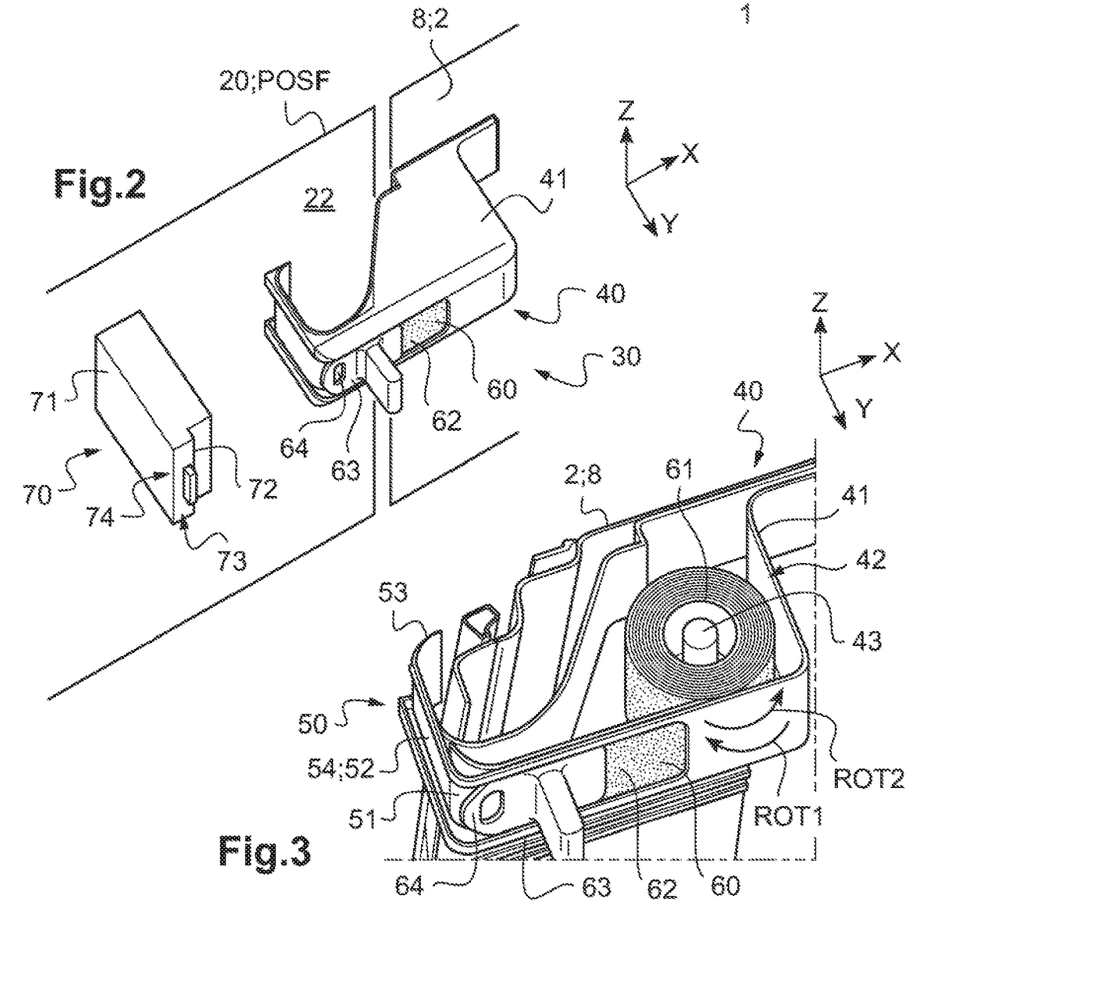
FIG. 2 is a diagram showing an assistance device of the invention.
FIG. 3 is a diagram showing a receptacle on a door.

FIG. 2 shows an assistance device 30 of the invention.

The assistance device 30 may be totally independent, in that it does not depend on any jettisoning system 85 and/or operating system 80 and/or closure system 95 and/or blocking device 96.

In addition, the assistance device 30 may be a passive device, i.e. without any motor and/or actuator. In FIG. 2, the winder 40 presents a casing 41 that is fastened on an inside face of the shell 2, e.g. the rear wall 8. The winder 40 then extends transversely into the cabin 5 from the shell 2. Furthermore, the winder 40 may project longitudinally from the shell 2 towards the opening 6 that is closed by the door 20.

In addition, the strap 60 is wound in part inside the casing 41. The strap 60 then extends to a free end 62 that is situated outside the casing 41. This free end 62 is secured to a latchplate 63. Such a latchplate 63 may be a conventional latchplate, e.g. of the type including a ring 64 like on a safety belt.

When the door is closed, the receptacle 70 may be situated longitudinally in line with the winder 40, substantially in the opening 6. The receptacle 70 has a body 71 that is fastened in the example of FIG. 2 to the rear segment 22 of the door 20. The receptacle 70 may be situated close to the center of gravity of the door. For example, the receptacle 70 may be situated substantially halfway up the door 20.

The body 71 may include a conventional attachment member 74, e.g. of the safety belt type.

Thus, the attachment member 74 may include a slot 72 into which the latchplate 63 is inserted. Furthermore, the attachment member 74 may include a movable hook or the equivalent for releasably holding the latchplate 63 so as to secure it to the receptacle 70. For example, a spring may tend to urge the hook into a position in which the hook can hold the latchplate 63, with a pushbutton 73 enabling the hook to be moved in order to release the latchplate 63.

FIG. 3 shows a winder 40 by representing one of the faces of the casing 41 on being transparent.

In the casing 41, the winder 40 has a drum 42. The drum 42 is arranged around a rod 43 secured to the casing 41. The drum 42 can thus turn about the rod 43.

Furthermore, the strap 60 extends from a first end 61 secured to the winder 40 to the free end 62 that is movable relative to the winder 40. The first end 61 may be arranged on the drum 42 or indeed it may be fastened to the drum 42. Rotation of the drum 42 in an unwinding direction ROT1 tends to unwind the strap 60 from the winder 40, while rotating the drum 42 in a winding direction ROT2 tends to wind the strap 60 around the drum 42.

Figure 4:
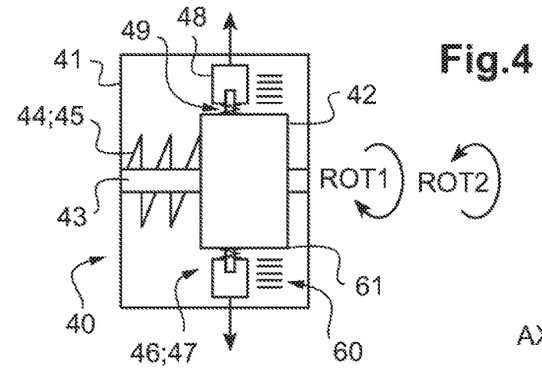
FIGS. 4 and 5 are diagrams showing a winder of the invention.

In one aspect and with reference to FIG. 4, the winder 40 need not have a motor.

In the example shown, the drum 42 is in connection with rewinding means 44. The rewinding means 44 store energy while the drum 42 is rotating in the unwinding direction ROT1 and they restore that energy while the drum 42 is rotating in the winding direction ROT2. For example, the rewinding means 44 comprise at least one spring 45. By way of example, such a spring 45 may be a coil spring interposed between the casing 41 and the drum 42 while being arranged around the rod 43. One end of the spring may be fastened to the casing 41, and/or another end of the spring may be fastened to the drum 42.

Independently of this aspect, the winder 40 may include a brake 46 for braking rotation of the drum 42 and thus braking winding and unwinding of the strap 60.

The brake 46 need not have a motor or an actuator. For example, the brake 46 may be a centrifugal brake 47. In the example shown diagrammatically, the centrifugal brake 47 has at least one flyweight 48 mounted on the drum 42 to move radially. Each flyweight can slide along a pin. Optionally, a spring 49 is arranged radially between each flyweight 48 and the drum 42. Under such circumstances, each flyweight 48 moves radially relative to the drum 42 while the drum 42 is rotating, with the movement of the flyweight 48 being proportional to the speed of rotation of the drum 42. As from a threshold speed, the flyweight 48 comes into contact with the casing 41, thereby tending to brake the drum 42.

Furthermore, and with reference to FIG. 3, the winder 40 may include deflector means 50 for guiding the strap to the outside when the door is open.

In FIG. 3, such deflector means 50 may comprise 180 degree deflector means situated between the drum 42 and the receptacle 70.

Thus, the deflector means 50 may be C-shaped, presenting a first circularly arcuate wall 51 extending the drum 42 in an unwinding direction for the strap, followed by a plane wall 52 and then by a second circularly arcuate wall 53.

Thus, when the strap 60 escapes from the winder 40, the strap slides in succession over the first circularly arcuate wall 51 in order to turn through 90 degrees towards the outside, over the plane wall 52, and then over the second circularly arcuate wall 53 in order to turn through 90 degrees and be pulled rearwards outside the shell 2.

Optionally, at least one wall of the deflector means has a rough face 54 in contact with the strap 60 in order to constitute a friction brake.

Figure 5:
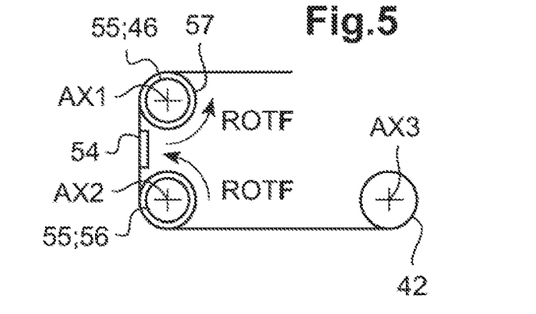
Figure 6:
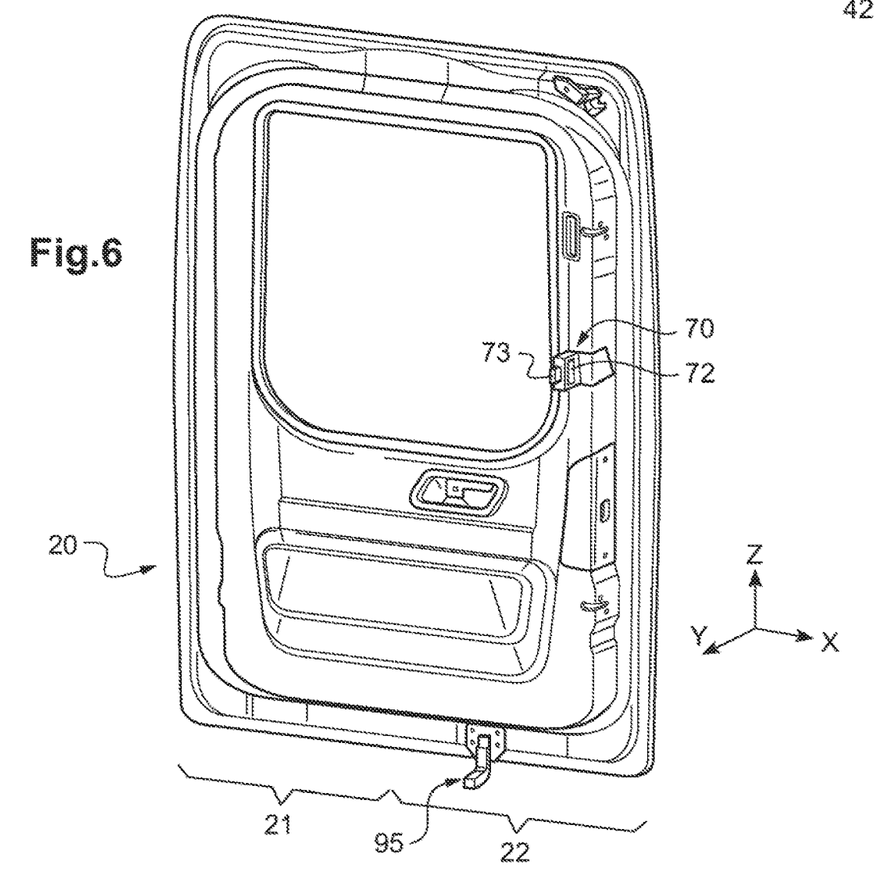
FIG. 6 is a diagram showing a door fitted with a receptacle.

In FIG. 5, the deflector means may include at least two rollers 55, each roller 55 having a respective axis of rotation AX1, AX2 parallel to the axis of rotation AX3 of the drum 42.

The deflector means may also include a plane wall 52 between the rollers 55.

Thus, when the strap 60 escapes from the winder 40, the strap passes in succession over the first roller in order to turn through 90 degrees towards the outside, possibly over the plane wall 52, and then over the second roller in order to turn through 90 degrees so as to be stretched rearwards outside the shell 2.

The brake 46 may comprise these two rollers 55 of the deflector means 50. For example, each roller 55 is then provided with a braking system 57, possibly a centrifugal system, and/or may be free to rotate in one direction only ROTF corresponding to closing the door 20.

Figures 7, 8, 9:
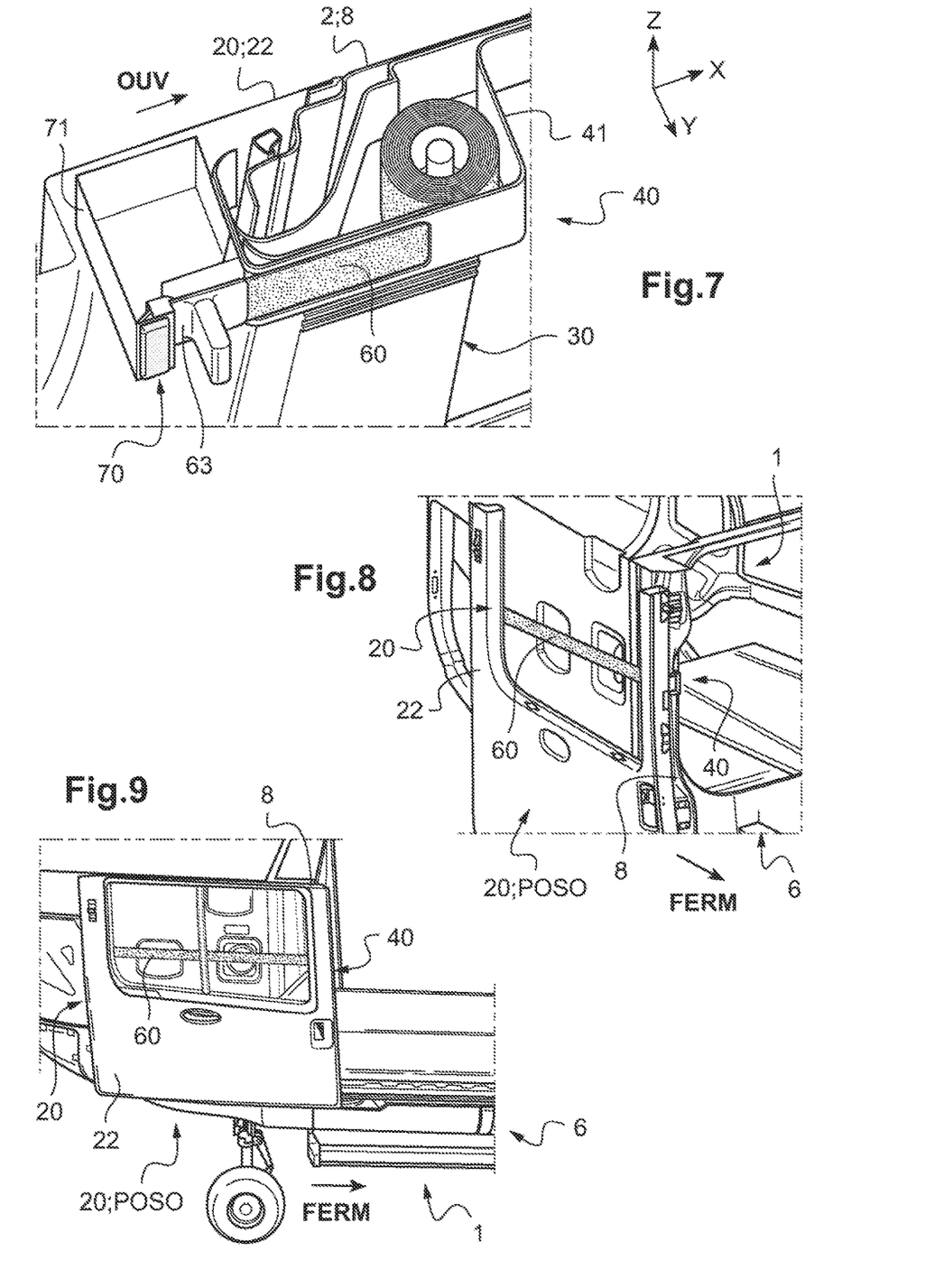
FIGS. 7 to 9 are diagrams showing a method of the invention for opening/closing a door on a vehicle.

FIGS. 7 to 9 explain the operation of the assistance device.

In FIG. 7, the casing 41 and the body 71 are shown as being partially transparent for explanatory purposes.

With reference to FIG. 7, when the assistance device 30 is in use, an operator attaches the strap 60 to the receptacle 70. For this purpose, the operator takes hold of the latchplate 63 and pushes it into the body 71 in order to secure it to the receptacle 70. The operator then opens the door at least by moving it rearwards in the opening direction OUV. For example, in the situation shown concerning a door for a rotorcraft, the movement begins with an outward movement since the door is a flush door, followed by rearward movement.

The strap is unwound from the winder, possibly being braked by the winder brake. The brake serves to limit the speed at which the door moves. The door then reaches end-of-stroke stops 90 under good conditions.

While it is moving rearwards, the rear winder means store energy. For example, a spring is compressed.

Where applicable, the door is blocked by a blocker device 96 once the open position POSO is reached.

With reference to FIGS. 8 and 9, by positioning the winder 40 and the receptacle on the rear wall 8 and the rear segment 22, the strap does not obstruct the opening 6 when the door 20 is open.

In order to close the door 20, the operator unblocks the blocker device 96, if any. Thereafter, the operator pulls on the door in order to move it in a closing direction FERM opposite to the opening direction OUV. Since the rewinder means have stored energy, the winder 40 winds in the strap

60 about a drum while exerting a force on the strap in order to assist the operator. More precisely, the rewinder means restore the stored energy by tending to cause the drum to rotate in its winding direction ROT2. For example, a spring that was compressed during opening of the door now relaxes.

The brake also makes it possible to limit the travel speed of the door.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A vehicle having a shell, the shell being provided with an opening in register with a cabin of the vehicle, the vehicle having a door slidably mounted on the shell to slide between a closed position and an open position, the door shutting the opening when in the closed position;
    wherein the vehicle includes at least one assistance device, the assistance device comprising two elements, the two elements comprising respectively a winder carrying a strap and a receptacle, the winder including a brake braking unwinding of the strap from the winder, one of the two elements being fastened to the shell and one of the two elements being fastened to the door, the strap extending to a free end carrying a latchplate, the receptacle comprising an attachment member that includes a slot and/or a hook for reversibly attaching the latchplate to the receptacle, the winder braking movement of the door during opening of the door and storing energy when the latchplate is attached to the receptacle, the winder assisting an operator to close the door by restoring the energy while closing the door when the latchplate is attached to the receptacle,
    wherein the door is slidably mounted on the shell by a mechanical operating system that is not motor-driven.

2. The vehicle according to claim 1, wherein the winder is not motor-driven.

3. The vehicle according to claim 1, wherein the brake comprises a centrifugal brake.

4. The vehicle according to claim 1, wherein the vehicle includes a jettisoning system for jettisoning the door, the jettisoning system being independent of the at least one assistance device.

5. The vehicle according to claim 1, wherein the vehicle includes a closure system for holding the door on request in the closed position, the closure system being independent of the at least one assistance device.

6. The vehicle according to claim 1, wherein the opening is defined longitudinally by walls of the shell, the walls being a rear wall and a front wall relative to the direction of advance of the vehicle, the door extending longitudinally from a rear segment to a front segment relative to the direction of advance, the door sliding from the closed position towards the open position in a direction going from the front wall towards the rear wall, and one of the two elements is fastened to the rear wall and one of the two elements is fastened to the rear segment.

7. The vehicle according to claim 6, wherein the winder is fastened to the rear wall and the receptacle is fastened to the rear segment.

8. The vehicle according to claim 1, wherein the winder includes deflector means.

9. The vehicle according to claim 8, wherein the brake comprises a rough face of the deflector means, the rough face being in contact with the strap, at least while the door is in the open position.

10. The vehicle according to claim 8, wherein the brake includes at least two rollers of the deflector means, each roller being provided with a brake system.

11. The vehicle according to claim 8, wherein the brake comprises at least two rollers of the deflector means, each roller being free to rotate in a single direction corresponding to a closing direction for the door.

12. The vehicle according to claim 1, wherein the vehicle is an aircraft.

13. The vehicle according to claim 1, wherein the winder comprises a drum having part of the strap wound thereabout, the drum being in connection with passive rewinder means that store energy when the drum rotates in an unwinding direction in which the strap is unwound, and that restore the energy when the drum rotates in a winding direction in which the strap is wound onto the drum.

14. The vehicle according to claim 13, wherein the rewinder means include at least one spring.

15. A vehicle having a shell, the shell being provided with an opening in register with a cabin of the vehicle, the vehicle having a door slidably mounted on the shell to slide between a closed position and an open position, the door shutting the opening when in the closed position;
    wherein the vehicle includes at least one assistance device, the assistance device comprising two elements, the two elements comprising respectively a winder carrying a strap and a receptacle, the winder including a brake braking unwinding of the strap from the winder, one of the two elements being fastened to the shell and one of the two elements being fastened to the door, the strap extending to a free end carrying a latchplate, the receptacle comprising an attachment member that includes a slot and/or a hook for reversibly attaching the latchplate to the receptacle, the winder braking movement of the door during opening of the door and storing energy when the latchplate is attached to the receptacle, the winder assisting an operator to close the door by restoring the energy while closing the door when the latchplate is attached to the receptacle,
    wherein the winder is not motor-driven.

16. The vehicle according to claim 15, wherein the vehicle is an aircraft and the opening is defined longitudinally by walls of the shell, the walls being a rear wall and a front wall relative to the direction of advance of the vehicle, the door extending longitudinally from a rear segment to a front segment relative to the direction of advance, the winder is fastened to the rear wall and the receptacle is fastened to the rear segment.

17. The vehicle according to claim 16, wherein the winder includes a deflector.

18. A vehicle having a shell, the shell being provided with an opening in register with a cabin of the vehicle, the vehicle having a door slidably mounted on the shell to slide between a closed position and an open position, the door shutting the opening when in the closed position;
    wherein the vehicle includes at least one assistance device, the assistance device comprising two elements, the two elements comprising respectively a winder carrying a strap and a receptacle, the winder including a brake braking unwinding of the strap from the winder, one of the two elements being fastened to the shell and one of the two elements being fastened to the door, the strap extending to a free end carrying a latchplate, the receptacle comprising an attachment member that includes a fastener for reversibly attaching the latchplate to the receptacle, the winder braking movement of the door during opening of the door and storing energy when the latchplate is attached to the receptacle, the winder assisting an operator to close the door by restoring the energy while closing the door when the latchplate is attached to the receptacle, wherein the brake comprises a centrifugal brake.

19. The vehicle according to claim 18, wherein the winder includes a deflector means, and the brake comprises a rough face of the deflector means, the rough face being in contact with the strap, at least while the door is in the open position.

20. The vehicle according to claim 19, wherein the winder includes a deflector means, and the brake includes at least two rollers of the deflector means, each roller being provided with a brake system.

\* \* \* \* \*